(12) United States Patent
Suzuki et al.

(10) Patent No.: US 9,191,902 B2
(45) Date of Patent: Nov. 17, 2015

(54) RADIO COMMUNICATION SYSTEM, BASE STATION DEVICE, MOBILE STATION DEVICE, RADIO COMMUNICATION METHOD, AND INTEGRATED CIRCUIT

(75) Inventors: Shoichi Suzuki, Osaka (JP); Yosuke Akimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 148 days.

(21) Appl. No.: 14/116,463

(22) PCT Filed: Apr. 4, 2012

(86) PCT No.: PCT/JP2012/059140
§ 371 (c)(1),
(2), (4) Date: Dec. 11, 2013

(87) PCT Pub. No.: WO2012/153580
PCT Pub. Date: Nov. 15, 2012

(65) Prior Publication Data
US 2014/0198743 A1    Jul. 17, 2014

(30) Foreign Application Priority Data
May 10, 2011    (JP) .................................. 2011-104910

(51) Int. Cl.
*H04W 4/00*    (2009.01)
*H04W 52/18*    (2009.01)
(Continued)

(52) U.S. Cl.
CPC ............. *H04W 52/18* (2013.01); *H04L 5/0053* (2013.01); *H04W 52/146* (2013.01); *H04W 52/16* (2013.01); *H04W 52/221* (2013.01); *H04W 52/228* (2013.01); *Y02B 60/50* (2013.01)

(58) Field of Classification Search
CPC ..... H04W 52/18; H04W 52/32; H04W 52/36; H04W 52/362; H04W 52/365; H04W 52/367; H04W 52/58
See application file for complete search history.

(56) References Cited

U.S. PATENT DOCUMENTS

| | | | |
|---|---|---|---|
| 2011/0038271 A1* | 2/2011 | Shin et al. .................... | 370/252 |
| 2011/0267994 A1* | 11/2011 | Pan et al. ..................... | 370/280 |
| 2011/0275403 A1* | 11/2011 | Chen et al. ................... | 455/522 |
| 2011/0319120 A1* | 12/2011 | Chen et al. ................... | 455/522 |

(Continued)

FOREIGN PATENT DOCUMENTS

WO    2011/031059 A2    3/2011

OTHER PUBLICATIONS

Official Communication issued in International Patent Application No. PCT/JP2012/059140, mailed on Jul. 3, 2012.
(Continued)

*Primary Examiner* — Alvin Zhu
(74) *Attorney, Agent, or Firm* — Keating & Bennett, LLP (57) ABSTRACT

In a radio communication system in which a mobile station device and a base station device communicate with each other, power of a signal from the mobile station device to the base station device is efficiently controlled. When a finally received DCI format for PUSCH is a DCI format 0 or a DCI format 4 in which two transport blocks are enabled, a scheduling unit (1013) notifies, to a transmission power control unit (1015), that $\delta_{power\text{-}offset}$ is 0. When the finally received DCI format for PUSCH is a DCI format 4 in which one of the transport blocks is disabled, the scheduling unit (1013) notifies, to the transmission power control unit (1015), $\delta_{power\text{-}offset}$ that is decided from a value set in a New data indicator field for the disabled transport block.

4 Claims, 6 Drawing Sheets

(51) Int. Cl.
*H04W 52/14* (2009.01)
*H04W 52/22* (2009.01)
*H04L 5/00* (2006.01)
*H04W 52/16* (2009.01)

(56) References Cited

U.S. PATENT DOCUMENTS

2012/0170533 A1    7/2012   Ahn et al.
2012/0208583 A1*   8/2012   Chung et al. .......... 455/509

OTHER PUBLICATIONS

Nishikawa et al., "Investigation on Resource Assignment and Power Control Schemes for Uplink MU-MIMO in Multi-cell Environments for LTE/LTE-Advanced", 16th Asia-Pacific Conference on Communications (APCC), 2010, pp. 319-323.

3GPP TS 36.212 V10.1.0, "3rd Generation Partnership Project; Technical Specification Group Radio Access Network; Evolved Universal Terrestrial Radio Access (E-UTRA); Multiplexing and channel coding (Release 10)", Mar. 2011, pp. 54-71.

3GPP TS 36.213 V10.1.0, "3rd Generation Partnership Project; Technical Specification Group Radio Access Network; Evolved Universal Terrestrial Radio Access (E-UTRA); Physical Layer Procedures (Release 10)", Mar. 2011, pp. 9-18.

* cited by examiner

| NEW DATA INDICATOR FIELD FOR THE DISABLED TRANSPORT BLOCK | $\delta_{power-offset}$ [dB] |
|---|---|
| 0 | $-10\log_{10}(2)$ |
| 1 | 0 |

FIG. 3

| TPC COMMAND FIELD | FIRST MODE [dB] | SECOND MODE [dB] |
|---|---|---|
| 0 | -1 | -4 |
| 1 | 0 | -1 |
| 2 | 1 | 1 |
| 3 | 3 | 4 |

RADIO COMMUNICATION SYSTEM, BASE STATION DEVICE, MOBILE STATION DEVICE, RADIO COMMUNICATION METHOD, AND INTEGRATED CIRCUIT

TECHNICAL FIELD

The present invention relates to a radio communication system, a base station device, a mobile station device, a radio communication method, and an integrated circuit.

BACKGROUND ART

Evolution of radio access methods and radio networks in cellular mobile communication (hereinafter called a "Long Term Evolution (LTE)" or "Evolved Universal Terrestrial Radio Access (EUTRA)") is studied in the 3rd Generation Partnership Project (3GPP). The LTE employs, as a communication method for radio communication from a base station device to a mobile station device (i.e., for a downlink), Orthogonal Frequency Division Multiplexing (OFDM) that is multi-carrier transmission. The LTE further employs, as a communication method for radio communication from a mobile station device to a base station device (i.e., for an uplink), SC-FDMA (Single-Carrier Frequency Division Multiple Access) that is single-carrier transmission. In the LTE, the base station device is called an enhanced NodeB (eNodeB), and the mobile station device is called User Equipment (UE).

In the LTE, the base station device employs Downlink Control Information (DCI) for instructing the mobile station device to perform initial transmission or retransmission for PUSCH (Physical Uplink Shared Channel) that is a channel for transmitting uplink data (also called "uplink shared channel (UL-SCH))". The Downlink Control Information is transmitted with PDCCH (Physical Downlink Control Channel).

In the LTE, MU-MIMO (Multi User-Multiple Input Multiple Output) is introduced to improve a capacity. The MU-MIMO implies a technique enabling each of plural mobile station devices to transmit one or plural data series at the same time and at the same frequency using PUSCH, and enabling a base station device to separate, per mobile station device, the one or plural data series transmitted from each of the mobile station devices upon receiving them.

Figure 7:
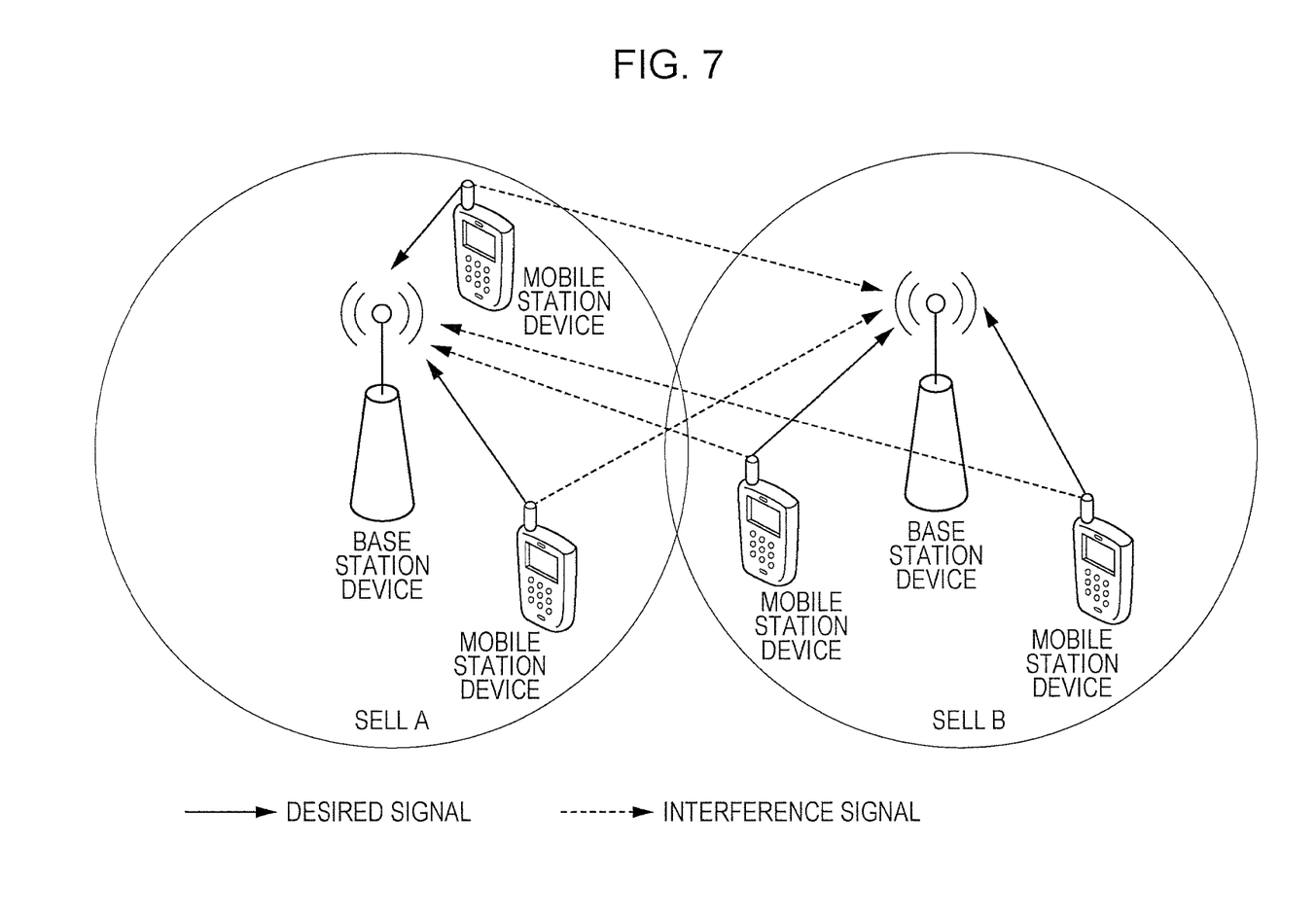
FIG. 7 illustrates interference signals interfering with an adjacent cell in related art.

However, because the plural data series from the plural mobile station devices are spatially multiplexed at the same frequency, interference with an adjacent cell increases. FIG. 7 illustrates interference signals interfering with an adjacent cell in related art. In a cell A illustrated in FIG. 7, a mobile station device 1A and a mobile station device 1B transmit signals to a base station device 3A, and the signal from the mobile station device 1A and the signal from the mobile station device 1B are spatially multiplexed. In a cell B illustrated in FIG. 7, a mobile station device 1C and a mobile station device 1D transmit signals to a base station device 3B. In such a situation, both the signal from the mobile station device 1A and the signal from the mobile station device 1B interfere with the cell B, while both the signal from the mobile station device 1C and the signal from the mobile station device 1D interfere with the cell A.

Non Patent Literature (NPL) 1 describes a technique of reducing power of a signal transmitted from each mobile station device depending on the number of mobile station devices which are scheduled at the same frequency, aiming to suppress the interference with the adjacent cell. With the technique of NPL 1, the mobile station device calculates transmission power based on a formula (3) in NPL 1.

CITATION LIST

Non Patent Literature

NPL 1: "Investigation on Resource Assignment and Power Control Schemes for Uplink MU-MIMO in Multi-cell Environments for LTE/LTE-Advanced", NTT DOCOMO, INC, 2010 16th Asia-Pacific Conference on Communications (APCC), Issue Date: Oct. 31 2010-Nov. 3 2010.

SUMMARY OF INVENTION

Technical Problem

However, the above-mentioned related art has a problem that the base station device is required to notify, to each mobile station device, the number of mobile station devices which are scheduled at the same frequency, and an overhead in a signal transmitted from the base station device to the mobile station device increases.

The present invention has been made in view of the above-mentioned problem, and an object of the present invention is to provide, in a radio communication system in which a base station device and a mobile station device communicate with each other, a radio communication system, a base station device, a mobile station device, a radio communication method, and an integrated circuit, which can suppress an increase of an overhead in a signal transmitted from the base station device to the mobile station device, and which can efficiently control power of a signal transmitted from the mobile station device to the base station device.

Solution to Problem (1) To achieve the above object, the present invention is constituted as follows. The present invention provides a mobile station device communicating with a base station device, wherein the mobile station device receives, from the base station device, downlink control information, which contains first transmission power control information and second transmission power control information, and which is used for scheduling of a physical uplink shared channel, accumulates a value indicated by the first transmission power control information, and calculates transmission power of the physical uplink shared channel by employing both an accumulated resultant value and a value indicated by the second transmission power control information.

(2) Furthermore, the present invention provides a mobile station device communicating with a base station device, wherein when downlink control information for two transport blocks, the downlink control information being received from the base station device, indicates that one of the transport blocks is disabled and the other transport block is enabled, the mobile station device calculates transmission power of a physical uplink shared channel by employing a power offset indicated by transmission power control information that is mapped to a field to which information indicating initial transmission or retransmission for the disabled transport block is to be mapped.

(3) In the above-mentioned mobile station device according to the present invention, the power offset is set to 0 when the downlink control information for two transport blocks, the downlink control information being received from the base station device, indicates that the two transport blocks are enabled.

(4) In the above-mentioned mobile station device according to the present invention, the power offset is set to 0 when downlink control information for one transport block is received from the base station device.

(5) Still further, the present invention provides a base station device communicating with a mobile station device, wherein the base station device transmits, to the mobile station device, downlink control information, which contains first transmission power control information and second transmission power control information, and which is used for scheduling of a physical uplink shared channel, a value indicated by the first transmission power control information is accumulated by the mobile station device, and an accumulated resultant value and a value indicated by the second transmission power control information are used by the mobile station device to calculate transmission power of the physical uplink shared channel.

(6) Still further, the present invention provides a base station device communicating with a mobile station device, wherein in a case of indicating, to the mobile station device, with downlink control information for two transport blocks that one of the transport blocks is disabled and the other transport block is enabled, the base station device maps transmission power control information indicating a power offset to a field to which information indicating initial transmission or retransmission for the disabled transport block is to be mapped.

(7) Still further, the present invention provides a radio communication system in which a base station device and a mobile station device communicate with each other, wherein the base station device transmits, to the mobile station device, downlink controls information, which contains first transmission power control information and second transmission power control information, and which is used for scheduling of a physical uplink shared channel, and wherein the mobile station device receives the downlink control information control information from the base station device, accumulates a value indicated by the first transmission power control information, and calculates transmission power of the physical uplink shared channel by employing both an accumulated resultant value and a value indicated by the second transmission power control information.

(8) Still further, the present invention provides a radio communication system in which a base station device and a mobile station device communicate with each other, wherein in a case of indicating, to the mobile station device, with downlink control information for two transport blocks that one of the transport blocks is disabled and the other transport block is enabled, the base station device maps transmission power control information indicating a power offset to a field to which information indicating initial transmission or retransmission for the disabled transport block is to be mapped, and transmits the downlink control information to the mobile station device, and wherein in a case of receiving the downlink control information from the base station device, the mobile station device calculates transmission power of a physical uplink shared channel by employing the power offset indicated by the transmission power control information.

(9) In the above-mentioned radio communication system according to the present invention, the mobile station device sets the power offset to 0 when the downlink control information for two transport blocks, the downlink control information being received from the base station device, indicates that the two transport blocks are enabled.

(10) In the above-mentioned radio communication system according to the present invention, the mobile station device sets the power offset to 0 when downlink control information for one transport block is received from the base station device.

(11) Still further, the present invention provides a radio communication method used in a mobile station device communicating with a base station device, the method comprising the steps of receiving, from the base station device, downlink control information, which contains first transmission power control information and second transmission power control information, and which is used for scheduling of a physical uplink shared channel, accumulating a value indicated by the first transmission power control information, and calculating transmission power of the physical uplink shared channel by employing both an accumulated resultant value and a value indicated by the second transmission power control information.

(12) Still further, the present invention provides a radio communication method used in a mobile station device communicating with a base station device, the method comprising the step of, when downlink control information for two transport blocks, the downlink control information being received from the base station device, indicates that one of the transport blocks is disabled and the other transport block is enabled, calculating transmission power of a physical uplink shared channel by employing a power offset indicated by transmission power control information that is mapped to a field to which information indicating initial transmission or retransmission for the disabled transport block is to be mapped.

(13) In the above-mentioned radio communication method according to the present invention, wherein the power offset is set to 0 when the downlink control information for two transport blocks, the downlink control information being received from the base station device, indicates that the two transport blocks are enabled.

(14) In the above-mentioned radio communication method according to the present invention, the power offset is set to 0 when downlink control information for one transport block is received from the base station device.

(15) Still further, the present invention provides a radio communication method used in a base station device communicating with a mobile station device, the method comprising the steps of transmitting, to the mobile station device, downlink control information, which contains first transmission power control information and second transmission power control information, and which is used for scheduling of a physical uplink shared channel, causing a value indicated by the first transmission power control information to be accumulated by the mobile station device, and causing an accumulated resultant value and a value indicated by the second transmission power control information to be used by the mobile station device to calculate transmission power of the physical uplink shared channel.

(16) Still further, the present invention provides a radio communication method used in a base station device communicating with a mobile station device, the method comprising the step of, in a case of indicating, to the mobile station device, with downlink control information for two transport blocks that one of the transport blocks is disabled and the other transport block is enabled, mapping transmission power control information indicating a power offset to a field to which information indicating initial transmission or retransmission for the disabled transport block is to be mapped.

(17) Still further, the present invention provides an integrated circuit used in a mobile station device communicating with a base station device, wherein the integrated circuit controls a process in a mobile station device for receiving, from the base station device, downlink control information, which contains first transmission power control information and second transmission power control information, and which is used for scheduling of a physical uplink shared channel, accumulates a value indicated by the first transmission power control information, and calculates transmission power of the physical uplink shared channel by employing both an accumulated resultant value and a value indicated by the second transmission power control information.

(18) Still further, the present invention provides an integrated circuit used in a mobile station device communicating with a base station device, wherein when downlink control information for two transport blocks, the downlink control information being received from the base station device, indicates that one of the transport blocks is disabled and the other transport block is enabled, the integrated circuit calculates transmission power of a physical uplink shared channel by employing a power offset indicated by transmission power control information that is mapped to a field to which information indicating initial transmission or retransmission for the disabled transport block is to be mapped.

(19) In the above-mentioned integrated circuit according to the present invention, the power offset is set to 0 when the downlink control information for two transport blocks, the downlink control information being received from the base station device, indicates that the two transport blocks are enabled.

(20) In the above-mentioned integrated circuit according to the present invention, the power offset is set to 0 when downlink control information for one transport block is received from the base station device.

(21) Still further, the present invention provides an integrated circuit used in a base station device communicating with a mobile station device, wherein the integrated circuit controls a process in the base station device for transmitting, to the mobile station device, downlink control information, which contains first transmission power control information and second transmission power control information, and which is used for scheduling of a physical uplink shared channel, a value indicated by the first transmission power control information is accumulated by the mobile station device, and an accumulated resultant value and a value indicated by the second transmission power control information are used by the mobile station device to calculate transmission power of the physical uplink shared channel.

(22) Still further, the present invention provides an integrated circuit used in a base station device communicating with a mobile station device, wherein in a case of indicating, to the mobile station device, with downlink control information for two transport blocks that one of the transport blocks is disabled and the other transport block is enabled, transmission power control information indicating a power offset is mapped to a field to which information indicating initial transmission or retransmission for the disabled transport block is to be mapped.

Advantageous Effects of Invention

According to the present invention, in the radio communication system in which the base station device and the mobile station device communicate with each other, power of the signal transmitted from the mobile station device to the base station device can be efficiently controlled.

DESCRIPTION OF EMBODIMENTS

First Embodiment

A first embodiment of the present invention will be described in detail below with reference to the drawings.

First, physical channels used in the present invention are described.

Figure 1:
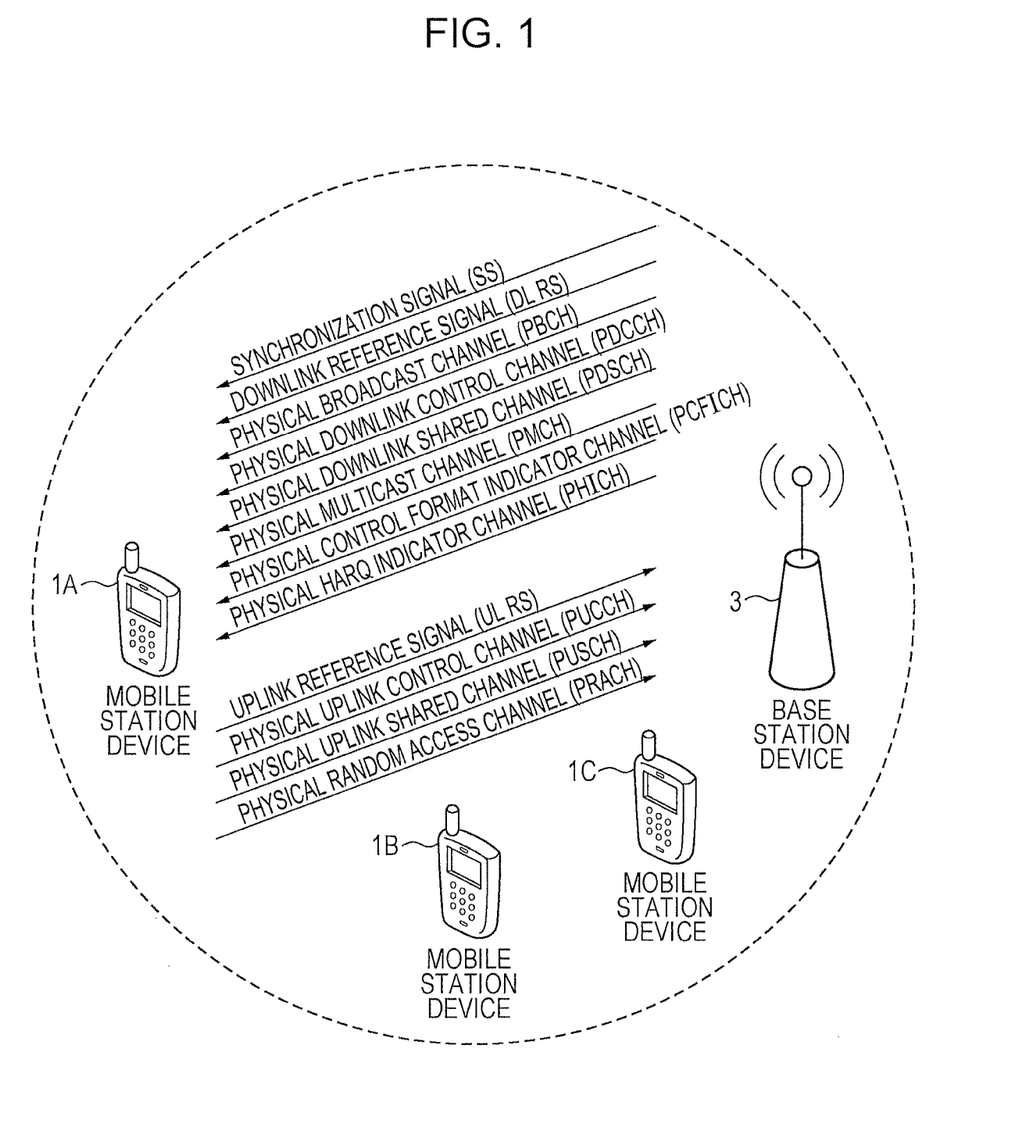
FIG. 1 is a conceptual view of a radio communication system according to an embodiment of the present invention.

FIG. 1 is a conceptual view of a radio communication system according to an embodiment of the present invention. In FIG. 1, the radio communication system includes mobile station devices 1A to 1C and a base station device 3. FIG. 1 indicates that a Synchronization Signal (SS), a Downlink Reference Signal (DL RS), a Physical Broadcast Channel (PBCH), a Physical Downlink Control Channel (PDCCH), a Physical Downlink Shared Channel (PDSCH), a Physical Multicast Channel (PMCH), a Physical Control Format Indicator Channel (PCFICH), and a Physical Hybrid ARQ Indicator Channel (PHICH) are used in radio communication (downlink) from the base station device to the mobile station devices 1A to 1C.

FIG. 1 also indicates that an Uplink Reference Signal (UL RS), a Physical Uplink Control Channel (PUCCH), a Physical Uplink Shared Channel (PUSCH), and a Physical Random Access Channel (PRACH) are used in radio communication (uplink) from the mobile station devices 1A to 1C to the base station device 3. In the following description, the mobile station devices 1A to 1C are collectively called the mobile station device 1.

Synchronization Signal is a signal used by the mobile station device 1 to maintain synchronization in a frequency domain and a time domain in the downlink. The Downlink Reference Signal is a signal used by the mobile station device 1 to maintain synchronization in a frequency domain and a time domain in the downlink, or by the mobile station device 1 to measure reception quality in the downlink, or by the mobile station device 1 to correct propagation paths of PDSCH and PDCCH. PBCH is a signal used to broadcast system information (Broadcast Channel: BCH). The system information transmitted with PBCH is called a "Master Information Block (MIB)".

PDCCH is a physical channel used to transmit Downlink Control Information (DCI), such as downlink assignment (also called downlink grant) and uplink grant. The downlink assignment is made up of Modulation and Coding Scheme (MCS), i.e., information regarding a modulation method and a coding rate for PDSCH, information indicating assignment of radio resources, etc. The uplink grant is made up of information regarding a modulation method and a coding rate for PDSCH, information indicating assignment of radio resources, etc. Detailed configuration of the uplink grant will be described in detail later.

PDSCH is a physical channel used to transmit paging information (Paging Channel: PCH), system information different from the system information transmitted with PBCH, and downlink data (Downlink Shared Channel: DL-SCH). The system information transmitted with PDSCH is called System Information Block (SIB). PMCH is a physical channel used to transmit information (Multicast Channel: MCH) regarding MBMS (Multimedia Broadcast and Multicast Service). PCFICH is a physical channel used to transmit information indicating an area in which PDSCH is allocated. PHICH is a physical channel to transmit a HARQ indicator (reply information) indicating success or failure in decoding of uplink data received by the base station device 3.

When the base station device 3 has succeeded in decoding of the uplink data contained in PUSCH, the HARQ indicator for the relevant uplink data indicates ACK (ACKnowledgement), and when the base station device 3 has failed in decoding of the uplink data contained in PUSCH, the HARQ indicator for the relevant uplink data indicates NACK (Negative ACKnowledgement). Single PHICH transmits the HARQ indicator for single uplink data. The HARQ indicator for plural uplink data contained in the same PUSCH is transmitted using plural PHICHs.

The Uplink Reference Signal is a signal used by the base station device 3 to maintain synchronization a time domain in the uplink, or by the base station device 3 to measure reception quality in the uplink, or by the base station device 3 to correct propagation paths of PUSCH and PUCCH. The Uplink Reference Signal includes DMRS (Demodulation Reference Signal) that is transmitted in time-multiplexed relation to PUSCH or PUCCH, and SRS (Sounding Reference Signal) that is transmitted irrespective of PUSCH and PUCCH.

PUCCH is a physical channel used to transmit Uplink Control Signal (UCI) that is information used in control of communication, such as Channel State Information (CSI) indicating channel quality of the downlink, a Scheduling Request (SR) indicating a request for radio resources of PUSCH, and ACK/NACK indicating success or failure of decoding of the downlink data received by the mobile station device 1.

PUSCH is a physical channel used to transmit uplink data and uplink control information. PRACH is a physical channel used to transmit a random access preamble. PRACH is mainly used for the mobile station device 1 to maintain synchronization in a time domain with respect to the base station device 3, and is also used to make initial access, handover, a reconnection request, and a request for assignment of radio resources of the uplink.

The uplink data (UL-SCH), the downlink data (DL-SCH), etc. belong to a transport channel. A unit in transmitting the uplink data with PUSCH and a unit in transmitting the downlink data with PUSCH are each called a transport block (TB). The transport block is a unit handled in a MAC (Media Access Control) layer, and HARQ (retransmission) is controller per transport block. A unit of data handled in the MAC layer, such as the uplink data (UL-SCH) and the downlink data (DL-SCH), is also called "MAC PDU (Protocol Data Unit)". In a physical layer, the transport block is mapped to code words and is subjected to a coding process per code word.

Cell aggregation (carrier aggregation) in the present invention will be described below.

Plural serving cells are aggregated in a cell aggregation process. Of the plural aggregated serving cells, one serving cell is a Primary cell (Pcell). The Primary cell is a serving cell having the functions equivalent to those of a cell in the LTE.

The serving cells except for the Primary cell are each a Secondary cell (Scell). The Secondary cell is a cell having the functions limited in comparison with the functions of the Primary cell, and it is mainly used to transmit and receive PDSCH and/or PUSCH. The mobile station device 1 transmits PUCCH by employing only the Primary cell. The mobile station device 1 does not receive the paging information and the system information, which are transmitted with PBCH and PDSCH of the Secondary cell.

A carrier corresponding to the serving cell in the downlink is Downlink Component Carrier (DL CC), and a carrier corresponding to the serving cell in the uplink is Uplink Component Carrier (UL CC). A carrier corresponding to the Primary cell in the downlink is Downlink Primary Component Carrier (DL PCC), and a carrier corresponding to the Primary cell in the uplink is Uplink Primary Component Carrier (UL PCC). A carrier corresponding to the Secondary cell in the downlink is Downlink Secondary Component Carrier (DL SCC), and a carrier corresponding to the Secondary cell in the uplink is Uplink Secondary Component Carrier (UL SCC).

A physical channel transmitted with the serving cell has the same channel structure as that in the LTE. Each physical channel is transmitted with any one serving cell. In other words, a single physical channel is not transmitted with plural serving cells. One serving cell (DL CC) can transmit one PDSCH, and one serving cell (UL CC) can transmit one PUSCH at maximum.

The downlink assignment used for scheduling of PDSCH of the Primary cell and the uplink grant used for scheduling of PUSCH of the Primary cell are transmitted with PDCCH of the Primary cell. One serving cell for transmitting, with PDCCH, the downlink assignment used for scheduling of PDSCH of the Secondary cell and the uplink grant used for scheduling of PUSCH of the Secondary cell is set by the base station device 3 per Secondary cell.

The base station device 3 sets, per serving cell, whether the downlink assignment and the uplink grant include a Carrier Indicator that is information indicating serving cells corresponding to the downlink assignment and the uplink grant. PHICH is transmitted with the serving cell that has transmitted the uplink grant used for scheduling of PUSCH corresponding to PHICH.

The configuration of the uplink grant in the present invention will be described below.

Plural formats are used for the Downlink Control Information. The formats for the Downlink Control Information are called "DCI formats". For example, a DCI format 0 used for scheduling of PUSCH in a single cell in a single antenna port mode, and a DCI format 4 used for scheduling of PUSCH in a single cell in a multi-antenna port mode are prepared as the DCI formats for the uplink grant. The mobile station device 1 monitors the DCI format 0 and the DCI format 4 at the same time. The mobile station device 1 transmits PUSCH in the single antenna port mode upon detecting the DCI format 0, and transmits PUSCH in the multi-antenna port mode upon detecting the DCI format 4. The mobile station device 1 transmits, to the base station device 3, a single transport block by employing single PUSCH in the single antenna port mode. The mobile station device 1 transmits, to the base station device 3, maximum two transport blocks by employing single PUSCH in the multi-antenna port mode.

In the multi-antenna port mode, the mobile station device 1 transmits PUSCH by employing MIMO SM (Multiple Input Multiple Output Spatial Multiplexing). The term "MIMO SM" implies a technique of transmitting and receiving plural signals in a state multiplexed into channels of plural spatial dimensions, which are realized with plural transmission antenna ports and plural receiving antenna ports. Here, the antenna port implies a logical antenna used in signal processing. One antenna port may be constituted by one physical antenna, or by plural physical antennas. The transmitting side using MIMO SM executes a process of forming spatial channels suitable for plural signals (called "precoding"), and transmits the plural signals, having been subjected to the precoding, by the plural transmission antennas. The receiving side using MIMO SM executes, on the plural signals received by plural receiving antennas, a process of properly demultiplexing the signals multiplexed into the channels of plural spatial dimensions.

Plural fields are defined in the DCI format 4, and an information bit is mapped to each of the plural fields. The fields defined in the DCI format 4 are listed below. It is to be noted that other fields than those listed below may also be defined in the DCI format 4.

Resource block assignment field to which is mapped an information bit indicating assignment of radio resources of PUSCH—[x] bit TPC command field to which is mapped an information bit used in Transmission Power Control (TPC) of PUSCH—2 bit Precoding information and number of layers field to which is mapped an information bit indicating the number of spatially multiplexed series and the precoding executed on those series—[3 or 6] bit Modulation and coding scheme and redundancy version for first transport block field to which is mapped an information bit indicating the modulation and the coding scheme and the redundancy version for the first transport block—5 bit New data indicator for first transport block field to which is mapped an information bit indicating an initial transmission or retransmission of the uplink data for the first transport block—1 bit Modulation and coding scheme and redundancy version for second transport block field to which is mapped an information bit indicating the modulation and the coding scheme and the redundancy version for the second transport block—5 bit New data indicator for second transport block field to which is mapped an information bit indicating initial transmission or retransmission of the uplink data for the second transport block—1 bit The bit number [x] of the Resource block assignment field is determined depending on an uplink bandwidth. The bit number of the Precoding information and number of layers field is 3 bit when the number of antenna ports in the case of the mobile station device 1 transmitting PUSCH is 2, and 6 bit when the number of antenna ports in the case of the mobile station device 1 transmitting PUSCH is 4. The redundancy version indicates which part of the coded bit series in the transport block is to be transmitted by the mobile station device 1 with PUSCH.

In the DCI format 4, in either the case of a combination where the Resource block assignment field indicates more than one Physical Resource Blocks (PRB) and 0 is set in the Modulation and coding scheme and redundancy version for first transport block field to which the transport block corresponds, or the case of a combination where the Resource block assignment field indicates one Physical Resource Block (PRB) and 28 is set in the Modulation and coding scheme and redundancy version for first transport block field to which the transport block corresponds, the relevant transport block is disabled. The mobile station device 1 determines the transport block, which is not disabled, to be enabled. The mobile station device 1 does not transmit the disabled transport block with PUSCH, and transmits the enabled transport block with PUSCH. The physical resource block is a unit for assignment of PUSCH and is made up of a frequency band (180 kHz) and a time band (0.5 msec) each having a preset width.

Figure 2:
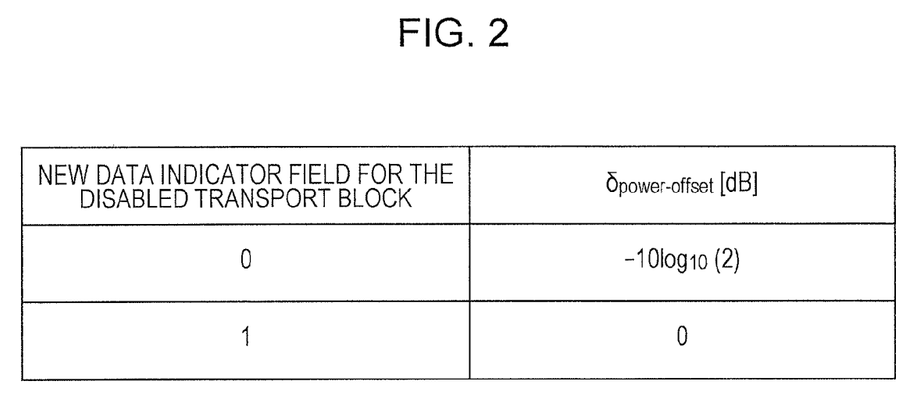
FIG. 2 is a table representing correspondence between New data indicator field for a disabled transport block and $\delta_{power\text{-}offset}$ in the present invention.

In the DCI format 4, when one of two transport blocks is disabled and the other one is enabled, the New data indicator field for the disabled transport block indicates $\delta_{power\text{-}offset}$. $\delta_{power\text{-}offset}$ is used for power control of PUSCH. FIG. 2 is a table representing correspondence between New data indicator field for the disabled transport block and $\delta_{power\text{-}offset}$ in the present invention. When the New data indicator field for the disabled transport block is set to 0, $\delta_{power\text{-}offset}$ is $-10\log_{10}(2)$. When the New data indicator field for the disabled transport block is set to 1, $\delta_{power\text{-}offset}$ is 0. When two transport blocks are enabled in the DCI format 4, or when PUSCH is scheduled in the DCI format 0, $\delta_{power\text{-}offset}$ is 0.

A coding method for the Downlink Control Information is described below. First, the base station device 3 adds, to the Downlink Control Information, Cyclic Redundancy Check (CRC) code that has been generated from the Downlink Control Information. The added Cyclic Redundancy Check code is then scrambled by RNTI (Radio Network Temporary Identifier). The mobile station device 1 changes interpretation of the Downlink Control Information depending on whether the Cyclic Redundancy Check code is scrambled by which RNTI.

For example, when the Cyclic Redundancy Check code is scrambled by CRNTI (Cell-Radio Network Temporary Identifier) that is assigned to the relevant mobile station device 1 from the base station device 3, the relevant mobile station device 1 determines that the Downlink Control Information indicates radio resources destined for the relevant mobile station device 1. When the Cyclic Redundancy Check code is scrambled by SPS (Semi Persistent Scheduling) C-RNTI that is assigned to the relevant mobile station device 1 from the base station device 3, the relevant mobile station device 1 determines that the Downlink Control Information indicates persistent (periodic) assignment of radio resources destined for the relevant mobile station device 1, or persistent release of radio resources, or retransmission of PUSCH having been transmitted with persistent radio resources.

In the following description, the fact that the Cyclic Redundancy Check code scrambled by RNTI is added to the Downlink Control Information is simply expressed by that RNTI is contained in the Downlink Control Information, or that RNTI is contained in PDCCH.

By decoding PDCCH, the mobile station device 1 determines that acquisition of PDCCH has succeeded when the Cyclic Redundancy Check code added to the Downlink Control Information and the Cyclic Redundancy Check code generated from the Downlink Control Information received by the mobile station device 1 are matched with each other, and that the decoding of PDCCH has failed when they are not matched with each other. Such a process is called "blind decoding" or "monitoring".

Transmission power control in the present invention will be described below.

The mobile station device 1 sets transmission power for PUSCH based on the following formula (1) or (2). More specifically, when the mobile station device 1 transmits PUSCH in a subframe i of a serving cell c without transmitting PUCCH at the same time, the mobile station device 1 sets transmission power $P_{PUSCH,c}(i)$ for PUSCH in the relevant subframe i of the serving cell c based on the following formula (1).

$$P_{PUSCH,c}(i) = \min \left\{ \begin{array}{l} P_{CMAX,c}(i), \\ 10\log_{10}(M_{PUSCH,c}(i)) + P_{O\_PUSCH,c} + \\ \alpha_c \cdot PL_c + \Delta_{TF,c}(i) + f_c(i) + \delta_{power\text{-}offset}(i) \end{array} \right\} \quad \text{[Math. 1]}$$

When the mobile station device 1 transmits PUCCH and PUSCH in the subframe i of the serving cell c at the same time, the mobile station device 1 sets transmission power $P_{PUSCH,c}(i)$ for PUSCH in the relevant subframe i of the serving cell c based on the following formula (2).

$$P_{PUSCH,c}(i) = \min \left\{ \begin{array}{l} 10\log_{10}(P'_{CMAX,c}(i) - P'_{PUCCH}(i)), \\ 10\log_{10}(M_{PUSCH,c}(i)) + \\ P_{O\_PUSCH,c} + \alpha_c \cdot PL_c + \\ \Delta_{TF,c}(i) + f_c(i) + \delta_{power\text{-}offset}(i) \end{array} \right\} \quad \text{[Math. 2]}$$

In the above formula, min{X,Y} represents a function of selecting a minimum value of X and Y. $P_{CMAX,c}$ represents a maximum transmission power vale set for the subframe i of the serving cell c, and $P'_{CMAX,c}$ represents an antilogarithm of $P_{CMAX,c}$. $M_{PUSCH,c}(i)$ represents a resource assignment band width for PUSCH, which is expressed by the number of physical resource blocks in the subframe i of the serving cell c. $P_{O\_PUSCH,c}$ is a parameter designated for the serving cell c from an higher layer. $\alpha_c$ is a 3-bit parameter designated for the serving cell c from an higher layer, and it is designated as one of {0, 0.4, 0.5, 0.6, 0.7, 0.8, 0.9, 1}. $PL_c$ represents a downlink path loss for the serving cell c, which is measured by the mobile station device 1. The downlink path loss for the serving cell c may be measured from the Primary cell. $\Delta_{TF,c}(i)$ represents an offset calculated from both a resource amount in initial transmission for PUSCH, which is transmitted in the subframe i of the serving cell c, and the size of the transport block.

Figure 3:
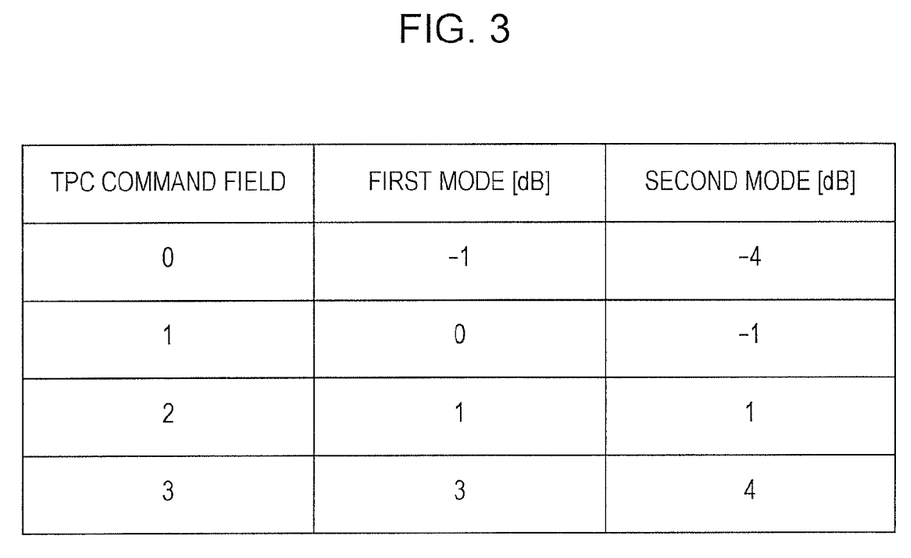
FIG. 3 is a table representing correspondence between a TPC command and a power value in the present invention.

Furthermore, $f_c(i)$ represents a value calculated from the TPC command that is contained in the DCI format 0 or the DCI format 4 for the serving cell c. As a mode for calculating $f_c(i)$ in response to an higher layer message received from the base station device 3, the mobile station device 1 sets a first mode (accumulation) or a second mode (absolute). The mobile station device 1 set in the first mode provides an initial value of $f_c(\cdot)$ as $f_c(0)=0$ and calculates $f_c(\cdot)$ by accumulating successive values of the TPC command for the serving cell c. The mobile station device 1 set in the second mode provides, as $f_c(i)$, a value of the TPC command for the subframe i of the serving cell c. FIG. 3 is a table representing correspondence between the TPC command and the power value in the present invention. The correspondence between the TPC command and the power value is different between the first mode and the second mode. In the first mode, the TPC command indicates one value of {−1, 0, 1, 3}. In the second mode, the TPC command indicates one value of {−4, −1, 1, 4}.

$\delta_{power\text{-}offset}(i)$ is a value that is explicitly or implicitly indicated by the DCI format 0 or the DCI format 4 for the serving cell c. When the New data indicator field for the disabled transport block is set to 0, $\delta_{power\text{-}offset}$ is −10 $\log_{10}$ (2). When the New data indicator field for the disabled transport block is set to 1, $\delta_{power\text{-}offset}$ is 0. When two transport blocks are enabled in the DCI format 4, or when PUSCH is scheduled in the DCI format 0, $\delta_{power\text{-}offset}$ is 0. When the mobile station device 1 does not receive the DCI format 0 and the DCI format 4 in the subframe I and it receives NACK with PHICH for the transport block, the mobile station device 1 determines a value of $\delta_{power\text{-}offset}$ in accordance with the DCI format 0 or the DCI format 4 that has been finally received for the relevant transport block.

The mobile station device 1 transmits Power Headroom (PH) per serving cell to the base station device 3. When the mobile station device 1 transmits PUSCH in the subframe i of the serving cell c without transmitting PUCCH at the same time, the mobile station device 1 calculates the Power Headroom $PH_{type1,c}(i)$ for PUSCH in the subframe i of the serving cell c from the following formula (3).

$$PH_{type1,c}(i) = P_{CMAX,c}(i) - \{10\log_{10}(M_{PUSCH,c}(i)) + P_{O\_PUSCH,c} + \alpha_c \cdot PL_c + \Delta_{TF,c}(i) + f_c(i) + \delta_{power\text{-}offset}\} \quad \text{[Math. 3]}$$

When the mobile station device 1 does not transmit PUCCH and PUSCH in the subframe i of the serving cell c, the mobile station device 1 calculates the Power Headroom $PH_{type1,c}(i)$ for PUSCH in the subframe i of the serving cell c from the following formula (4).

$$PH_{type1,c}(i) = P''_{CMAX,c}(i) - \{P_{O\_PUSCH,c} + \alpha_c \cdot PL_c + f_c(i)\} \quad \text{[Math. 4]}$$

$P''_{CMAX,c}$ represents a maximum transmission power value set on an assumption that any back-off is not taken in the subframe i of the serving cell c. The formula (4) corresponds to a formula resulting from changing $P_{CMAX,c}$ to $P''_{CMAX,c}$ and setting $M_{PUSCH,c}(i)$ to 1, $\Delta_{TF,c}(i)$ to 0, and $\delta_{power\text{-}offset}(i)$ to 0 in the formula (3), respectively.

The device configuration according to the present invention will be described below.

Figure 4:
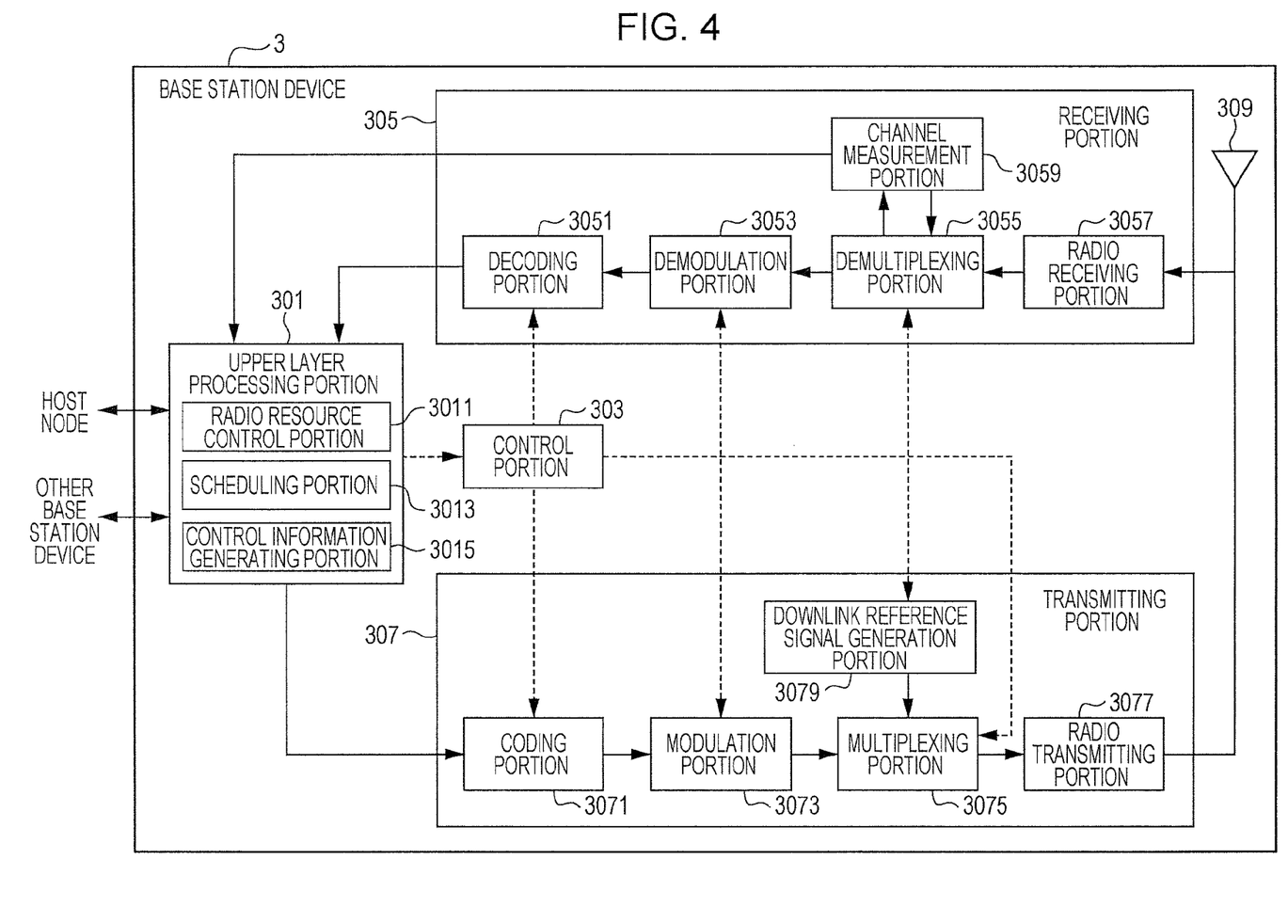
FIG. 4 is a schematic block diagram illustrating the configuration of a base station device 3 according to the present invention.

FIG. 4 is a schematic block diagram illustrating the configuration of the base station device 3 according to the present invention. As illustrated in FIG. 4, the base station device 3 includes an higher layer processing unit 301, a control unit 303, a receiving unit 305, a transmitting unit 307, and a transmitting/receiving antenna 309. The higher layer processing unit 301 includes a radio resource control unit 3011, a scheduling unit 3013, and a control information generating unit 3015. The receiving unit 305 includes a decoding unit 3051, a demodulation unit 3053, a demultiplexing unit 3055, a radio receiving unit 3057, and a channel measurement unit 3059. The transmitting unit 307 includes a coding unit 3071, a modulation unit 3073, a multiplexing unit 3075, a radio transmitting unit 3077, and a Downlink Reference Signal generation unit 3079.

The higher layer processing unit 301 executes processing in a MAC (Medium Access Control) layer, a Packet Data Convergence Protocol (PDCP) layer, a Radio Link Control (RLC) layer, and a Radio Resource Control (RRC) layer. The higher layer processing unit 301 generates control information and outputs the same to the control unit 303 in order to control the receiving unit 305 and the transmitting unit 307.

The radio resource control unit 3011 in the higher layer processing unit 301 generates downlink data (transport block), an RRC signal, and MAC CE (Control Element), which are allocated in PDSCH in the downlink, or acquires them from a host node, and outputs them to the transmitting unit 307. Furthermore, the radio resource control unit 3011 manages various items of setting information for each mobile station device 1. For example, the radio resource control unit 3011 executes management of the mode of the TPC command, management of the serving cells set in the mobile station device 1, and so on.

The scheduling unit 3013 in the higher layer processing unit 301 executes scheduling of PDSCH and PDSCH, and notifies the scheduling result to the control information generating unit 3015. More specifically, the scheduling unit 3013 determines a pair of mobile station devices 1 executing MU-MIMO, and notifies the pair of mobile station devices 1 executing MU-MIMO to the Downlink Control Information generating unit 3015. The scheduling unit 3013 determines a parameter regarding the uplink transmission power, and notifies the determined parameter to the control information generating unit 3015.

The control information generating unit 3015 in the higher layer processing unit 301 generates Downlink Control Information, which is to be transmitted with PDCCH, based on the scheduling result notified from the scheduling unit 3013. The control information generating unit 3015 generates the DCI format 4 for indicating, to the mobile station devices 1 notified from the scheduling unit 3013 and executing MU-MIMO, the fact that one transport block is disabled and that $\delta_{power-offset}$ is $-10 \log_{10}(2)$. Based on the parameter regarding the uplink transmission power notified from the scheduling unit 3013, the control information generating unit 3015 generates information indicating the relevant parameter.

Based on the control information from the higher layer processing unit 301, the control unit 303 generates control signals for executing control of the receiving unit 305 and the transmitting unit 307. The control unit 303 outputs the generated control signals to the receiving unit 305 and the transmitting unit 307, and controls the receiving unit 305 and the transmitting unit 307.

In accordance with the control signal input from the control unit 303, the receiving unit 305 executes demultiplexing, demodulation, and decoding of PUCCH, PUSCH, PRACH, and the Uplink Reference Signal, which have been received from the mobile station device 1 via the transmitting/receiving antenna 309, and outputs the decoded information to the higher layer processing unit 301. The receiving unit 305 measures a channel state of the uplink from the received uplink signal, and outputs the measured result to the higher layer processing unit 301.

In accordance with the control signal input from the control unit 303, the transmitting unit 307 generates the Downlink Reference Signal, and then codes and modulates the HARQ indicator, the Downlink Control Information, and the downlink data, which are input from the higher layer processing unit 301. Moreover, the transmitting unit 307 multiplexes PHICH, PDCCH, PDSCH, and the Downlink Reference Signal, and transmits the multiplexed signals to the mobile station device 1 via the transmitting/receiving antenna 309.

Figure 5:
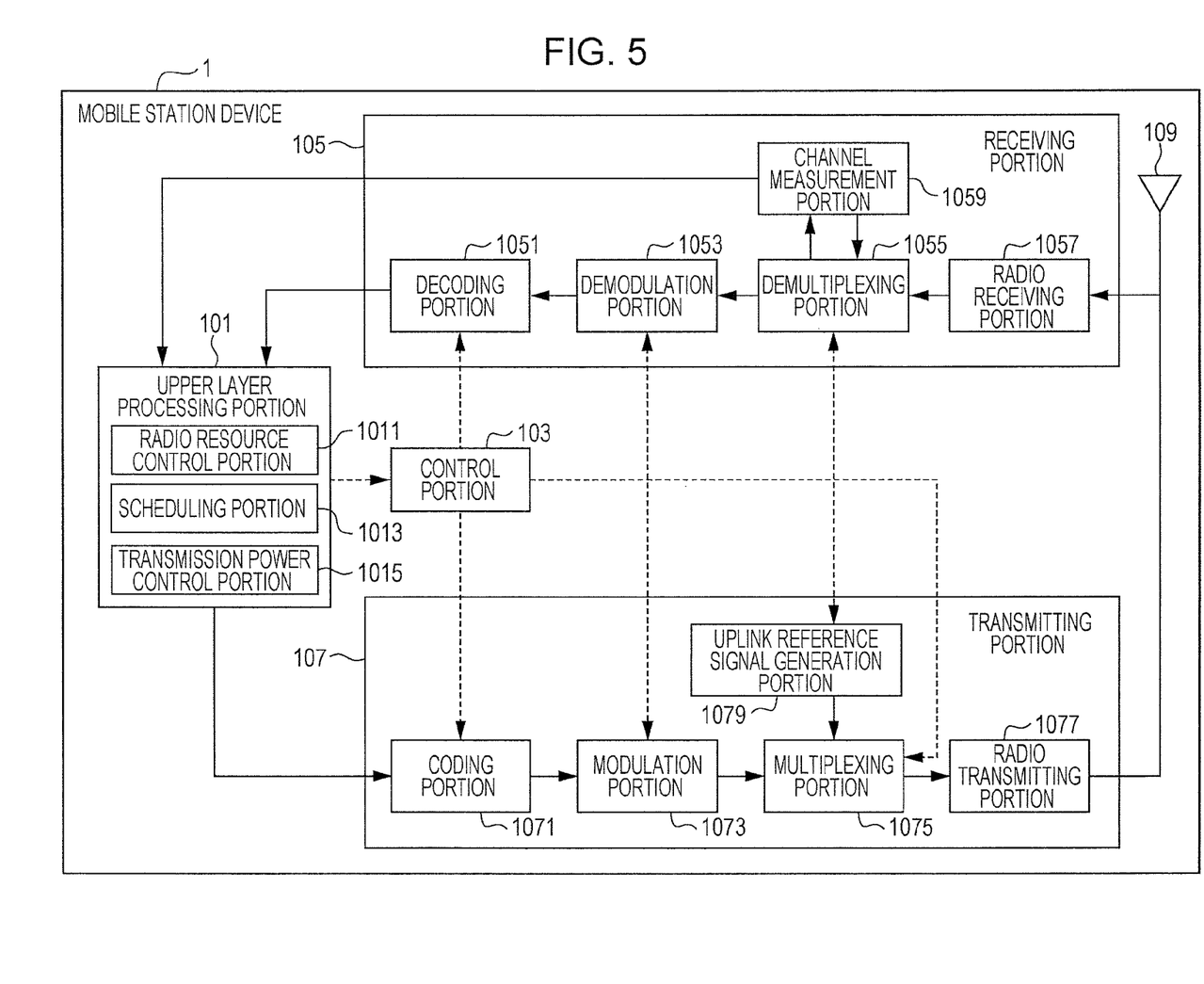
FIG. 5 is a schematic block diagram illustrating the configuration of a mobile station device 1 according to the present invention.

FIG. 5 is a schematic block diagram illustrating the configuration of the mobile station device 1 according to the present invention. As illustrated in FIG. 5, the mobile station device 1 includes an higher layer processing unit 101, a control unit 103, a receiving unit 105, a transmitting unit 107, and a transmitting/receiving antenna 109. The higher layer processing unit 101 includes a radio resource control unit 1011, a scheduling unit 1013, and a transmission power control unit 1015. The receiving unit 105 includes a decoding unit 1051, a demodulation unit 1053, a demultiplexing unit 1055, a radio receiving unit 1057, and a channel measurement unit 1059. The transmitting unit 107 includes a coding unit 1071, a modulation unit 1073, a multiplexing unit 1075, a radio transmitting unit 1077, and an Uplink Reference Signal generation unit 1079.

The higher layer processing unit 101 outputs uplink data generated with user's manipulation, etc. to the transmitting unit 107. Furthermore, the higher layer processing unit 101 executes processing in the MAC (Medium Access Control) layer, the Packet Data Convergence Protocol (PDCP) layer, the Radio Link Control (RLC) layer, and the Radio Resource Control (RRC) layer. In addition, the higher layer processing unit 101 generates control information and outputs the same to the control unit 103 in order to control the receiving unit 105 and the transmitting unit 107.

The radio resource control unit 1011 in the higher layer processing unit 101 manages various items of setting information for the relevant mobile station device 1. For example, the radio resource control unit 1011 executes management of the mode of the TPC command, and management of the serving cells. The radio resource control unit 1011 generates information to be allocated to each channel in the uplink, and outputs the generated information to the transmitting unit 107.

The scheduling unit 1013 in the higher layer processing unit 101 controls the receiving unit 105 via the control unit 103 so as to receive PUSCH in accordance with the downlink assignment input from the receiving unit 105. The scheduling unit 1013 controls the transmitting unit 107 via the control unit 103 so as to transmit PUSCH in accordance with the uplink grant input from the receiving unit 105. The scheduling unit 1013 outputs the TPC command, which is contained in the uplink grant, to the transmission power control unit 1015. When the DCI format finally received for PUSCH is the DCI format 0 or the DCI format 4 in which two transport blocks are enabled, the scheduling unit 1013 notifies the transmission power control unit 1015 of $\delta_{power-offset}$ being 0. When the DCI format finally received for PUSCH is the DCI format 4 in which one transport block is disabled, the scheduling unit 1013 notifies the transmission power control unit 1015 of $\delta_{power-offset}$ that is determined from a value set in the New data indicator field for the disabled transport block.

The transmission power control unit 1015 in the higher layer processing unit 101 executes setting of the transmission power for PUSCH based on the formula (1) or (2) by employing the TPC command and $\delta_{power-offset}$, which are input from the scheduling unit 1013. When the first mode (accumulation) is set, the transmission power control unit 1015 sets the initial value of $f_c(\cdot)$ as $f_c(0)=0$ and calculates $f_c(\cdot)$ by accumulating successive values of the TPC command input from the scheduling unit 1013. When the second mode (absolute) is set, the transmission power control unit 1015 sets a value of the TPC command input from the scheduling unit 1013 as $f_c(i)$.

Based on the control information from the higher layer processing unit 101, the control unit 103 generates control signals for executing control of the receiving unit 105 and the transmitting unit 107. The control unit 103 outputs the generated control signals to the receiving unit 105 and the transmitting unit 107, and controls the receiving unit 105 and the transmitting unit 107.

In accordance with the control signal input from the control unit 103, the receiving unit 105 executes demultiplexing, demodulation, and decoding of PHICH, PDCCH, PDSCH, and the Downlink Reference Signal, which have been received from the base station device 3 via the transmitting/receiving antenna 109, and outputs the decoded information to the higher layer processing unit 101. The receiving unit 105 measures a channel state of the uplink from the received downlink signal, and outputs the measured result to the higher layer processing unit 101.

In accordance with the control signal input from the control unit 103, the transmitting unit 107 generates the Uplink Reference Signal, and then codes and modulates the uplink data (transport blocks) input from the higher layer processing unit 101. Moreover, the transmitting unit 107 multiplexes PUCCH, PUSCH, and the generated Uplink Reference Signal, and transmits them to the base station device 3 via the transmitting/receiving antenna 109.

The device operation according to the present invention will be described below.

Figure 6:
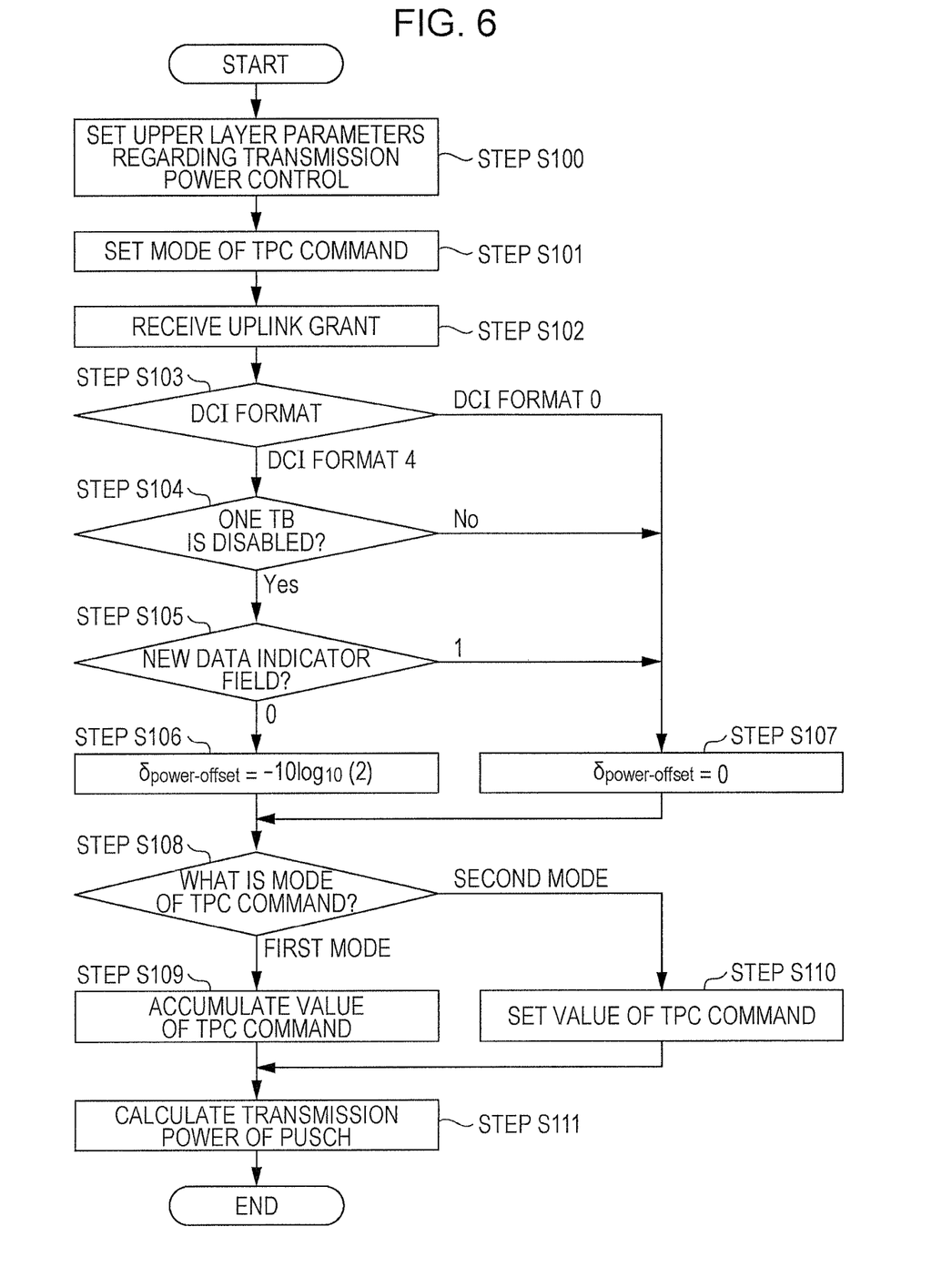
FIG. 6 is a flowchart illustrating one example of the operation of the mobile station device 1 according to the present invention.

FIG. 6 is a flowchart illustrating one example of the operation of the mobile station device 1 according to the present invention. The mobile station device 1 sets higher layer parameters regarding the transmission power control, which have been received from the base station device 3 (step S100). The mobile station device 1 receives, from the base station device 3, an higher layer signal indicating the mode of the TPC command and sets the mode of the TPC command in accordance with the received higher layer signal (step S102). If the higher layer signal indicating the mode of the TPC command is not received from the base station device 3, the mobile station device 1 sets the mode of the TPC command to a default mode. The default mode is a preset mode, and it may be the first mode or the second mode.

The mobile station device 1 receives the uplink grant (DCI format 0 or DCI format 4) used in the scheduling of PUSCH (step S102). If the finally received uplink grant is the DCI format 4 (DCI format 4 in step S103) and one transport block (TB) is disabled (Yes in step S104), the mobile station device 1 determines the value set in the New data indicator field for the disabled transport block (step S105) in order to decide $\delta_{power-offset}$.

If it is determined in step S105 that 0 is set in the New data indicator field (0 in step S105), the mobile station device 1 decides $\delta_{power-offset}$ as $-10 \log_{10}(2)$ (step S106). If it is determined in step S105 that 1 is set in the New data indicator field (1 in step S105), the mobile station device 1 decides $\delta_{power-offset}$ as 0 (step S107).

If it is determined in step S103 that the finally received uplink grant is the DCI format 0 (DCI format 0 in step S103), the mobile station device 1 decides $\delta_{power-offset}$ as 0 (step S107). If it is determined in step S104 that two transport blocks are enabled (No in step S104), the mobile station device 1 decides $\delta_{power-offset}$ as 0 (step S107).

After step S106 or step S107, the mobile station device 1 determines the mode of the TPC command, which has been set in step S101 (step S108). If the mode of the TPC command is the first mode (accumulation) (first mode in step S108), the mobile station device 1 sets the initial value of $f_c(\cdot)$ as $f_c(0)=0$ and calculates $f_c(\cdot)$ by accumulating successive values of the TPC command for the serving cell c (step S109). If the mode of the TPC command is the second mode (absolute) (second mode in step S108), the mobile station device 1 sets the value of the TPC command as $f_c(i)$ (step S110).

After step S109 or step S110, the mobile station device 1 calculates the transmission power of PUSCH from the formula (1) or (2) (step S111). After step S111, the mobile station device 1 brings the process for calculating the transmission power of PUSCH to an end.

Thus, according to the present invention, in the radio communication system in which the base station device 3 and the mobile station device 1 communicate with each other, the base station device 3 transmits, to the mobile station device 1, the DCI format 4 (Downlink Control Information), which contains the TPC command (first transmission power control information) and information (second transmission power control information) indicating $\delta_{power-offset}$ and which is used for scheduling of PUSCH (Physical Uplink Shared Channel). The mobile station device 1 receives the DCI format 4 from the base station device 3, accumulates a value indicated by the TPC command (first transmission power control information), and calculates the transmission power of PUSCH using both an accumulated resultant value and a value of $\delta_{power-offset}$. As a result, the transmission power of PUSCH can be controlled accurately.

Furthermore, according to the present invention, in the radio communication system in which the base station device 3 and the mobile station device 1 communicate with each other, when the DCI format 4 (Downlink Control Information for two transport blocks) notifies the mobile station device 1 of the fact that one of the transport blocks is disabled and the other transport block is enabled, the base station device 3 maps transmission power control information, indicating $\delta_{power-offset}$ (power offset), to the New data indicator field (i.e., the field to which information indicating initial transmission or retransmission is to be mapped) for the disabled transport block, and transmits the DCI format 4 to the mobile station device 1. Upon receiving the DCI format 4 from the base station device 3, the mobile station device 1 calculates the transmission power of PUSCH based on $\delta_{power-offset}$ indicated by the transmission power control information.

As a result, the base station device 3 can notify $\delta_{power-offset}$ to the mobile station device 1 by reusing the New data indicator field for the disabled transport block, and can efficiently control the power of a signal transmitted from the mobile station device to the base station device.

Programs for operating the base station device 3 and the mobile station device 1 according to the present invention may be programs for controlling a CPU (Central Processing Unit), etc. (i.e., programs causing a computer to function) in such a way that the functions of the above-described embodiments of the present invention are realized. Information handled by those devices is temporarily stored in a RAM (Random Access Memory) when the relevant information is to be processed. Thereafter, the information is stored in any of various ROMs, e.g., Flash ROM (Read Only Memory), or in a HDD (Hard Disk Drive), and is read, corrected, and written by the CPU as required.

Parts of the mobile station device 1 and the base station device 3 in the above-described embodiments may be realized with a computer. In such a case, programs for realizing the control functions of those parts may be recorded on a computer-readable recording medium, and the programs recorded on the recording medium may be read and executed by a computer system, thus realizing the control functions.

The term "computer system" used herein implies a computer system incorporated in the mobile station device 1 or the base station device 3, and includes an OS and hardware, such as peripheral devices. The term "computer-readable recording medium" implies a transportable medium, such as a flexible disk, a magneto-optical disk, a ROM, or a CD-ROM, and a storage device, such as a hard disk incorporated in the computer system.

Furthermore, the "computer-readable recording medium" may include an implement for holding a program for a short time in a dynamic way, e.g., a network such as the Internet or a communication line such as a telephone line, when the program is transmitted via the network or the communication line, and a unit for holding the program for a certain time, e.g., a volatile memory incorporated in the computer system, which serves as a server or a client in the above-mentioned case. The program may realize a part of the above-described functions, or may realize the above-described functions in combination with another program already recorded in the computer system.

Each of the mobile station device 1 and the base station device 3 in the above-described embodiments may be partly or entirely realized in the form of an LSI, which is a typical integrated circuit, or a chip set. The functional blocks of the mobile station device 1 and the base station device 3 may be individually realized in the form of chips, or they may be partly or entirely integrated into one or more chips. The integrated circuit is not limited to the LSI, and it may be realized using a dedicated circuit or a universal processor. In addition, if a technique for realizing an integrated circuit instead of the LSI technique will be developed with the progress of the semiconductor technology, the integrated circuit manufactured with the developed technique can also be used.

Although the embodiments of the present invention have been described in detail above with reference to the drawings, practical configurations are not limited to the above-described ones, and various modifications in design, etc. can be made without departing from the gist of the present invention.

REFERENCE SIGNS LIST

1 (1A, 1B, 1C) . . . mobile station device, 3 . . . base station device, 101 . . . higher layer processing unit, 103 . . . control unit, 105 . . . receiving unit, 107 . . . transmitting unit, 301 . . . higher layer processing unit, 303 . . . control unit, 305 . . . receiving unit, 307 . . . transmitting unit, 1011 . . . radio resource control unit, 1013 . . . scheduling unit, 1015 . . . transmission power control unit, 3011 . . . radio resource control unit, 3013 . . . scheduling unit, and 3015 . . . control information generating unit.

The invention claimed is:

1. A mobile station device communicating with a base station device, comprising:
   a transmitter that receives, from the base station device, downlink control information for two transport blocks, which contains first transmission power control information and second transmission power control information, and which is used for scheduling of a physical uplink shared channel, and
   a transmission power control circuit that:
      accumulates a value indicated by the first transmission power control information, and
      calculates transmission power of the physical uplink shared channel by employing at least both an accumulated resultant value and a power offset value indicated by the second transmission power control information; wherein
   in a case that the downlink control information for the two transport blocks indicates that one of the two transport blocks is disabled and another of the two transport blocks is enabled, the second transmission power control information is mapped to a field to which information indicating initial transmission or retransmission for the one of the two transport blocks is to be mapped.

2. The mobile station device according to claim 1, wherein the power offset value is set to 0 in a case that the downlink control information for the two transport blocks, the downlink control information being received from the base station device, indicates that the two transport blocks are enabled.

3. The mobile station device according to claim 1, wherein the power offset value is set to 0 in a case that downlink control information for one transport block is received from the base station device.

4. A base station device communicating with a mobile station device, comprising:
   a transmitter that transmits, to the mobile station device, downlink control information for two transport blocks, which contains first transmission power control information and second transmission power control information, and which is used for scheduling of a physical uplink shared channel, wherein
   a value indicated by the first transmission power control information is accumulated by the mobile station device, and
   at least an accumulated resultant value and a power offset value indicated by the second transmission power control information are used by the mobile station device to calculate transmission power of the physical uplink shared channel, and
   in a case that the downlink control information for the two transport blocks indicates that one of the two transport blocks is disabled and another of the two transport blocks is enabled, the second transmission power control information is mapped to a field to which information indicating initial transmission or retransmission for the one of the two transport blocks is to be mapped.

* * * * *